US012558816B2

(12) United States Patent　　　(10) Patent No.:　US 12,558,816 B2
Onodera et al.　　　　　　　　　(45) Date of Patent:　　Feb. 24, 2026

(54) PREPREG, MOLDED ARTICLE, AND INTEGRALLY MOLDED ARTICLE

(71) Applicant: Toray Industries, Inc., Tokyo (JP)

(72) Inventors: Miho Onodera, Ehime (JP); Yoshiki Takebe, Ehime (JP); Yuta Naito, Ehime (JP); Jun Misumi, Ehime (JP); Yoshifumi Nakayama, Ehime (JP); Masato Honma, Ehime (JP)

(73) Assignee: Toray Industries, Inc., Tokyo (JP)

( * ) Notice: Subject to any disclaimer, the term of this patent is extended or adjusted under 35 U.S.C. 154(b) by 356 days.

(21) Appl. No.: 18/270,013

(22) PCT Filed: Dec. 21, 2021

(86) PCT No.: PCT/JP2021/047257
§ 371 (c)(1),
(2) Date: Jun. 28, 2023

(87) PCT Pub. No.: WO2022/158222
PCT Pub. Date: Jul. 28, 2022

(65) Prior Publication Data
US 2024/0066758 A1　　Feb. 29, 2024

(30) Foreign Application Priority Data
Jan. 21, 2021　(JP) ................................. 2021-007774

(51) Int. Cl.
*B32B 5/10*　　　　(2006.01)
*B29B 11/16*　　　(2006.01)
(Continued)

(52) U.S. Cl.
CPC ................ *B29B 11/16* (2013.01); *B32B 5/10* (2013.01); *C08J 5/243* (2021.05); (Continued)

(58) Field of Classification Search
CPC ........... B29B 11/16; B32B 5/10; B32B 27/08; B29K 2105/088
See application file for complete search history.

(56) References Cited

U.S. PATENT DOCUMENTS

2012/0094106 A1 * 4/2012 Honma ............... B29C 65/8215
　　　　　　　　　　　　　　　　　428/299.1
2015/0030791 A1 1/2015 Tsuchiya et al.
(Continued)

FOREIGN PATENT DOCUMENTS

JP　　　10138354 A　　5/1998
JP　　2004315743 A　　11/2004
(Continued)

OTHER PUBLICATIONS

International Search Report and Written Opinion for International Application No. PCT/JP2021/047257, dated Mar. 1, 2022, 5 pages.

*Primary Examiner* — Joanna Pleszczynska
(74) *Attorney, Agent, or Firm* — Buchanan Ingersoll & Rooney PC

(57) ABSTRACT

A problem to be solved by the present invention is to provide a prepreg and an integrally molded article, wherein the prepreg exhibits suitable flexibility and adhesiveness, excels in formability on a complicated mold face and adhesion to a mold face, causes no positional shift, and can be efficiently reinforced and stiffened at an intended position. A main object of the present invention is to provide a prepreg including (A) reinforcing fibers, (B) a thermosetting resin, and (C) a thermoplastic resin, wherein the (C) thermoplastic resin exists in at least a part of a face of the prepreg, and wherein the prepreg satisfies the condition [I], and satisfies the condition [II] or the condition [III]: [I]: the (B) thermosetting resin has a peak in the temperature range of more than 100° C. and 180° C. or less on a loss tangent (tan δ) curve measured under isokinetic heating by dynamic
(Continued)

mechanical analysis (DMA); [II]: on a loss angle δ curve obtained by measuring the prepreg isothermally by dynamic mechanical analysis (DMA), the loss angle δ curve has a point representing the maximum value, and has a point which represents a loss angle δ value 5° or more smaller than the maximum value, and which is on the earlier time side of the point representing the maximum value; and [III]: even if, on the loss angle δ curve obtained by measuring the prepreg isothermally by dynamic mechanical analysis (DMA), the loss angle δ curve has a point representing the maximum value, the loss angle δ curve does not have a point which represents a loss angle δ value 5° or more smaller than the maximum value, and which is on the earlier time side of the point representing the maximum value, or the loss angle δ curve does not have a point representing the maximum value, and has a descendingly behaving section in which the loss angle δ value becomes 5° or more smaller at a slope of −1.4°/minute or more.

9 Claims, 3 Drawing Sheets

(51) Int. Cl.
B32B 27/08 (2006.01)
C08J 5/24 (2006.01)

*B29K 101/10* (2006.01)
*B29K 101/12* (2006.01)
*B29K 105/08* (2006.01)

(52) U.S. Cl.
CPC ...... *B29K 2101/10* (2013.01); *B29K 2101/12* (2013.01); *B29K 2105/0881* (2013.01); *C08J 2363/02* (2013.01); *C08J 2423/30* (2013.01); *C08J 2471/10* (2013.01); *C08J 2477/02* (2013.01); *C08J 2481/06* (2013.01)

(56) References Cited

U.S. PATENT DOCUMENTS

| | | | | | |
|---|---|---|---|---|---|
| 2016/0075872 | A1* | 3/2016 | Palmese | .............. | C08G 59/027 |
| | | | | | 523/400 |
| 2022/0213284 | A1 | 7/2022 | Misumi et al. | | |

FOREIGN PATENT DOCUMENTS

| | | | |
|---|---|---|---|
| JP | 2012086578 A | 5/2012 | |
| JP | 2016113472 A | 6/2016 | |
| JP | 2018161801 A | 10/2018 | |
| WO | 2020235487 A1 | 11/2020 | |

* cited by examiner

PREPREG, MOLDED ARTICLE, AND INTEGRALLY MOLDED ARTICLE

CROSS REFERENCE TO RELATED APPLICATIONS

This application is the U.S. National Phase of PCT/JP2021/047257, filed Dec. 21, 2021, which claims priority to Japanese Patent Application No. 2021-007774, filed Jan. 21, 2021, the disclosures of these applications being incorporated herein by reference in their entireties for all purposes.

FIELD OF THE INVENTION

The present invention relates to a prepreg including reinforcing fibers impregnated with a thermosetting resin, in which a thermoplastic resin exists on at least a part of a face of the prepreg.

BACKGROUND OF THE INVENTION

A fiber-reinforced composite material contains a thermosetting resin used as a matrix and combined with reinforcing fibers such as carbon fibers or glass fibers. Although lightweight, such a fiber-reinforced composite material excels in mechanical properties such as strength and stiffness, heat resistance, and in addition, corrosion resistance, and thus, is utilized in many fields such as aerospace, automobiles, railroad vehicles, ships, civil engineering and construction, and sports goods. However, such a fiber-reinforced composite material is unsuitable for producing complicatedly shaped parts and structures in a single molding process. Accordingly, in the above-mentioned applications, it is often desired that a member composed of a fiber-reinforced composite material is produced, and then, integrated with a member of the same or different kind. Examples of techniques to be used to integrally combine a member of the same kind as or a different kind from a fiber-reinforced composite material composed of reinforcing fibers and a thermosetting resin include a mechanical joining method using a bolt, rivet, bis, or the like, and a joining method using an adhesive. A mechanical joining method involves a step of preliminarily processing a part to be joined, for example, drilling, and thus, has a problem in that such a method leads to prolonging the time for production processes and increasing the production cost, and additionally, that such drilling leads to decreasing the material strength. A joining method using an adhesive involves an adhering step including an adhesive preparation operation and an adhesive application operation, also involves a curing step, and thus, has a problem in that such a method leads to prolonging the time for production processes, and does not afford sufficient satisfaction in the reliability of the adhesive strength.

In response to such problems, Patent Literature 1 discloses a method in which fiber-reinforced composite materials composed of reinforcing fibers and a thermosetting resin are joined with an adhesive. In addition, Patent Literature 2 discloses a technique in which a fiber-reinforced composite material composed of reinforcing fibers and a thermosetting resin and containing a thermoplastic resin on a face of the composite material is injection-molded integrally with a member formed of a thermoplastic resin.

PATENT LITERATURE

Patent Literature 1: JP2018-161801A
Patent Literature 2: JP10-138354A

SUMMARY OF THE INVENTION

In general, such a method as described in Patent Literature 1, in which members are adhered to each other with an adhesive, takes time to cure the adhesive, and in addition, the joining strength depends on the strength of the adhesive itself in some cases.

Patent Literature 2 discloses a technique in which a thermoplastic resin film is laminated on a face of a prepreg composed of reinforcing fibers and a thermosetting resin, the resulting laminate is then cured under heating and pressing to obtain a fiber-reinforced composite material containing a prepreg integrated with a thermoplastic resin layer, and then, a member containing a thermoplastic resin is injection-molded integrally with the thermoplastic resin layer of the face of the fiber-reinforced composite material. However, such a fiber-reinforced composite material obtained by this technique has a cured thermosetting resin, and hence, is rigid, being difficult to form using a mold having a complicated face shape. In addition, a cured thermosetting resin loses tackiness on the surface thereof, and thus, cannot be fixed accurately at a desired position in a mold, and may be poor in accuracy of disposition for efficient reinforcing and stiffening. Because of this, the technology described in Patent Literature 2 is conceivably limited to application to a mold having a simple planar shape.

A problem to be solved by the present invention is to provide a prepreg having a thermoplastic resin in the surface thereof, wherein the prepreg has suitable flexibility and tackiness, and excels in formability on a complicated mold face and adhesion to a mold face. In addition, another problem to be solved by the present invention is to use the prepreg to produce a molding product of a fiber-reinforced composite material and of excellent quality, particularly to produce a molding product even in complicated shape without difficulty.

The above-mentioned problems can be solved with a prepreg including (A) reinforcing fibers, (B) a thermosetting resin, and (C) a thermoplastic resin, wherein the (A) reinforcing fibers are impregnated with the (B) thermosetting resin, wherein the (C) thermoplastic resin exists in at least a part of a face of the prepreg, and wherein the prepreg satisfies a condition [I], and satisfies a condition [II] or a condition [III]:

[I]: the (B) thermosetting resin has a peak in the temperature range of more than 100° C. and 180° C. or less on a loss tangent (tan δ) curve measured under isokinetic heating by dynamic mechanical analysis (DMA);

[II]: on a loss angle δ curve obtained by measuring the prepreg isothermally by dynamic mechanical analysis (DMA), the loss angle δ curve has a point representing the maximum value, and has a point which represents a loss angle δ value 5° or more smaller than the maximum value, and which is on the earlier time side of the point representing the maximum value; and

[III]: on the loss angle δ curve obtained by measuring the prepreg isothermally by dynamic mechanical analysis (DMA), even if the loss angle δ curve has a point representing the maximum value, the loss angle δ curve does not have a point which represents a loss angle δ value 5° or more smaller than the maximum value, and which is on the earlier time side of the point representing the maximum value, or the loss angle δ curve does not have a point representing the maximum value, and has a descendingly behaving section in which the loss angle δ value becomes 5° or more smaller at a slope of −1.4°/minute or more.

The present invention makes it possible to obtain a prepreg having a thermoplastic resin in the surface thereof, wherein the prepreg has suitable flexibility and tackiness, and excels in formability on a complicated mold face and adhesion to a mold face. In addition, using a prepreg according to the present invention makes it possible to obtain a molding product of a fiber-reinforced composite material and of excellent quality. Furthermore, even when used for reinforcing and stiffening, a prepreg according to the present invention is not prone to cause a positional shift, and can be disposed at an intended position efficiently.

DETAILED DESCRIPTION OF EMBODIMENTS OF THE INVENTION

Below, the present invention will be described in detail with reference to specific examples.

Figures 1, 2:
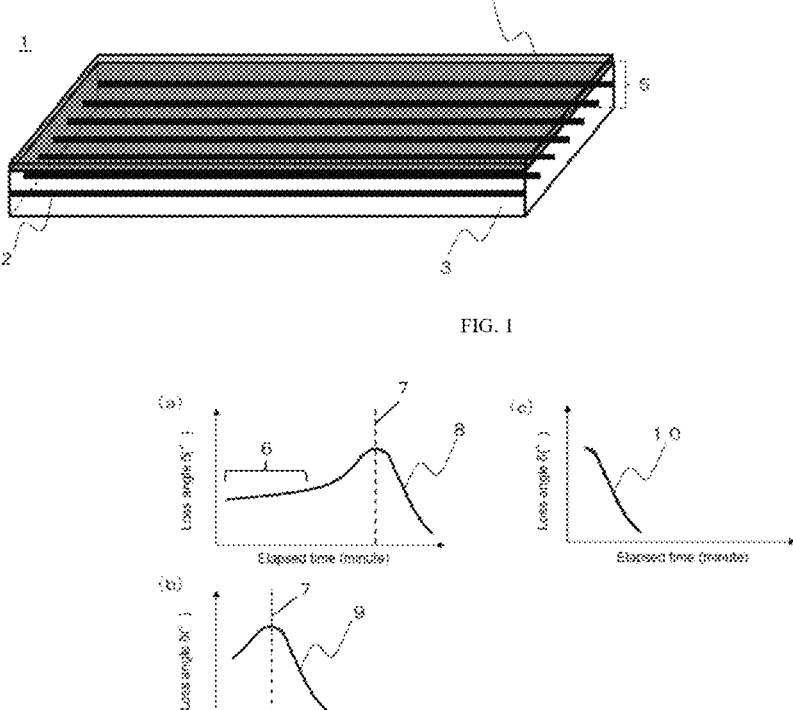
FIG. 1 is a schematic view (perspective view) of a prepreg that is one embodiment of a prepreg according to the present invention, in which (C) a thermoplastic resin layer is provided all over a layer in which (A) reinforcing fibers are impregnated with (B) a thermosetting resin.
FIG. 2 is graphs for explaining a loss angle δ curve prepared using, as a measuring object, a region in which (A) reinforcing fibers are impregnated with (B) a thermosetting resin.

FIG. 1 depicts one embodiment of a prepreg according to the present invention. In the prepreg depicted in FIG. 1, the (A) reinforcing fibers are impregnated with the (B) thermosetting resin, and in addition, the (C) thermoplastic resin is provided in one face of the prepreg in sheet form. The (C) thermoplastic resin has thermal weldability, and hence, such a face containing the (C) thermoplastic resin can be welded, in a short time and in good condition, to another member, in particular, a member the face of which contains a thermoplastic resin. Here, the existence of the (C) thermoplastic resin is not limited to any particular form, and the whole surface of the prepreg may be covered, or a part of the face may be covered, with the (C) thermoplastic resin. Alternatively, the (C) thermoplastic resin may exist in an aspect in which a plurality of thermoplastic resin regions are provided in the form of islands. From the viewpoint of ensuring stable thermal weldability, the ratio of the (C) thermoplastic resin in the face is preferably 50% or more, more preferably 80% or more, with respect to 100% of the area of that face of the prepreg in which the (C) thermoplastic resin exists. Among these, an aspect in which the (C) thermoplastic resin covers 100% of one face of the prepreg, that is, the (C) thermoplastic resin is provided in the form of a layer in the face, is more preferable. In this regard, in the depiction of FIG. 1, the (A) reinforcing fibers and the sides invisible perspectively in reality are depicted with solid lines to help understand the invention, but the (A) reinforcing fibers are actually in the prepreg. In this regard, FIG. 1 is a perspective view.

In the prepreg depicted in FIG. 1, the (C) thermoplastic resin does not exist in the face opposite from the face in which the (C) thermoplastic resin exists. That is, the (C) thermoplastic resin exists only in one face of the prepreg, and the other face is formed with the layer in which the (A) reinforcing fibers are impregnated with (B) thermosetting resin. Such an aspect makes it possible to exhibit suitable adhesiveness at a mold temperature (60 to 160° C.) common for injection molding and compression molding, and to inhibit the prepreg from causing a positional shift in a mold.

A prepreg according to the present invention is based on the condition [I] that the (B) thermosetting resin has a peak at more than 100° C. and 180° C. or less on a loss tangent (tan δ) curve measured under isokinetic heating by dynamic mechanical analysis (DMA). In the present invention, the loss tangent (tan δ) curve obtained from the (B) thermosetting resin by dynamic mechanical analysis (DMA) is determined in accordance with the following method. That is, i) the thermoplastic resin portion is removed from the prepreg to prepare one sample piece composed of only a thermosetting resin and reinforcing fibers. The amount of the sample is approximately 1 g.

ii) A dynamic mechanical analyzer is used to determine the peak temperature on a tan δ curve obtained by an isokinetic heating measurement in accordance with JIS C6481. The peak temperature is on a curve drawn with temperature as the abscissa and with the tan δ determined as the ratio (G"/G') of the loss modulus G" of the prepreg to the storage modulus G' of the prepreg as the ordinate.

The measurement conditions are as follows.

Heating rate: 5° C./minute

Frequency: 1 Hz

A prepreg according to the present invention is more easily disposed in a mold for molding because bringing, to more than 100° C., the peak temperature on a tan δ curve obtained from the relationship between the temperature and the tan δ inhibits the adhesiveness of the thermosetting resin to make the handleability good. On the other hand, when the peak temperature on the tan δ curve is 100° C. or less, the prepreg exhibits adhesiveness in a room-temperature environment (23° C.), thus making the handleability poor, and making it difficult to dispose the prepreg in a mold for molding. Bringing the peak temperature to 180° C. or less on the tan δ curve makes it possible to exhibit suitable flexibility and adhesiveness at a common mold temperature (60 to 160° C.), to easily form the prepreg on a complicated mold face, and to inhibit the prepreg from causing a positional shift in a mold. On the other hand, when the peak temperature on the tan δ curve is more than 180° C., the prepreg is solidified further, and does not exhibit suitable flexibility and adhesiveness at a common mold face temperature (60 to 160° C.), makes it difficult to form the prepreg on a mold face having a complicated shape, and causes the prepreg disposed in a mold to undergo a positional shift. That is, in a case where a prepreg having a high-heat resistant resin as a matrix exhibits the peak temperature out of the range of more than 100° C. and 180° C. or less on the tan δ curve of the thermosetting resin, the prepreg makes it possible neither to efficiently reinforce and stiffen a member containing a thermoplastic resin, nor to obtain an integrally molded article having excellent appearance characteristics. The range of the peak temperature on the tan δ curve of the thermosetting resin is preferably more than 105° C. and 160° C. or less, still more preferably more than 110° C. and 140° C. or less.

In this regard, it is known that the peak temperature on a tan δ curve of a thermosetting resin depends on the degree of cure of the thermosetting resin. A prepreg that satisfies the condition [I] can be obtained, for example, by adjusting the curing temperature and time for the thermosetting resin to be used and thereby adjusting the degree of cure of the thermosetting resin in the prepreg.

Furthermore, a prepreg according to the present invention satisfies the condition [II] or the condition [III]. Here, whether the condition [II] or the condition [III] is satisfied is determined by measuring the region in which the (A) reinforcing fibers are impregnated with the (B) thermosetting resin.

The condition [II] is that, on a loss angle δ curve obtained by isothermally measuring, by dynamic mechanical analysis (DMA), the region in which the (A) reinforcing fibers are impregnated with the (B) thermosetting resin, the loss angle δ curve has a point representing the maximum value, and has a point which represents a loss angle δ value 5° or more smaller than the maximum value, and which is on the earlier time side of the point representing the maximum value. In the present invention, the loss angle δ curve is determined in accordance with the following method. That is, i) a thermoplastic resin is removed from a prepreg to prepare one sample piece composed only of a thermosetting resin and reinforcing fibers. Furthermore, the sample pieces are laminated so as to have a thickness of approximately 0.5 to 3 mm, typically a thickness of approximately 1 mm, to obtain a sample. Here, in cases where the sample pieces are unidirectional materials, the pieces are symmetrically laminated.

ii) A dynamic mechanical analyzer is used to make a measurement under isothermal conditions in accordance with JIS K7244-10. A curve is drawn with elapsed time as the abscissa and with the loss angle $\delta(°)=\tan^{-1}(G''/G')$ determined with the storage modulus G' of the prepreg and the loss modulus G'' of the prepreg as the ordinate.

The measurement conditions are as follows. In this regard, the measurement temperatures are the following three measurement temperatures at which a measurement is made. Any one of the resulting loss angle δ curves needs only to satisfy the above-mentioned or below-mentioned preferable conditions for the loss angle δ curve. Here, a mold temperature to be selected for use in molding is a temperature at which these conditions are satisfied, or a temperature near the temperature. In this connection, the thermosetting resins used in Examples can be integrally molded at a mold temperature of 140° C. for injection molding, and hence, the results determined at a measurement temperature of 140° C. are described. In addition, the mold temperature is preferably lower from an energy efficiency viewpoint, and hence, the prepreg preferably gives the above-mentioned or below-mentioned preferable loss angle δ curve at a measurement temperature of 140° C.

Heating rate: 5° C./minute

Starting rate: 30° C.

Measurement temperature: 80° C., 110° C., or 140° C.

Frequency: 10 Hz

Having one peak up to which the height viewed from the earlier time side on a loss angle δ curve, that is, the amount of variation of the positive loss angle is 5° or more allows suitable flexibility and adhesiveness to be exhibited at a surface temperature (60 to 160° C.) common for a mold for injection molding and compression molding. Accordingly, the prepreg is easy to form on a curved mold face having a small radius of curvature. Additionally, in molding performed using a horizontal injection machine, the prepreg can be easily adhered to a mold face standing vertically, and thus, enables integrated molding without causing a positional shift due to the influence of the vibration during mold closing or the pressure during resin filling. The shape of a loss angle δ curve having a peak can be the shape (shape 1) illustrated in FIG. 2 (*a*) in which the maximum value appears after the region 6 in the form of a gentle slope having no ups or downs, or the shape (shape 2) illustrated in FIG. 2 (*b*) in which the maximum value appears after the curve having a positive slope ascending at 1.4°/minute or more. Among these, the shape 2 is more preferable. Thus, the prepreg in a room-temperature environment (23° C.) has no adhesiveness on a face thereof, and thus, has further excellent handleability.

The condition [III] is that: even if, on the loss angle δ curve obtained by isothermally measuring, by dynamic mechanical analysis (DMA), the region in which the (A) reinforcing fibers are impregnated with the (B) thermosetting resin, the loss angle δ curve has a point representing the maximum value, the loss angle δ curve does not have a point which represents a loss angle δ value 5° or more smaller than the maximum value, and which is on the earlier time side of the point representing the maximum value, or the loss angle δ curve does not have a point representing the maximum value, and has a descendingly behaving section in which the loss angle δ value becomes 5° or more smaller at a slope of −1.4°/minute or more, as illustrated in FIG. 2 (*c*). Whether this section exists is determined by whether a region with the loss angle δ curve decreasing with elapsed time has any section having a width of decrease of 5° and a slope of −1.4°/minute or more. Because of this, the prepreg has excellent handleability in a room-temperature environment (23° C.), exhibits flexibility and adhesiveness at a surface temperature (60 to 160° C.) common for a mold for injection molding and compression molding. Accordingly, the prepreg can be formed on a flat plate or a curved mold face having a large radius of curvature. In particular, the prepreg has excellent shape retainability, and thus, can withstand even high pressure during large-area high-pressure molding.

That is, the prepreg having a peak up to which the height viewed from the earlier time side on a loss angle δ curve is 5° or more allows suitable flexibility and adhesiveness to be exhibited at a surface temperature (60 to 160° C.) common for a mold for injection molding and compression molding, thus is easily formed, and hence, is used suitably on a curved mold face having a small radius of curvature. A prepreg having no peak is slightly rigid, compared with the prepreg having a peak, but has excellent shape retainability to withstand a high pressure, and thus, is used suitably for high-pressure molding on a flat plate or a curved mold face having a large radius of curvature.

Figure 3:
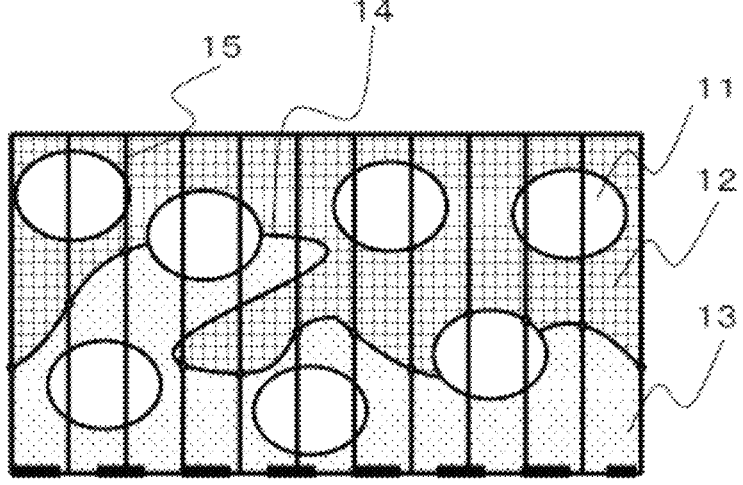
FIG. 3 is a cross-sectional schematic view of one embodiment of a prepreg according to the present invention.

Additionally, as depicted in FIG. 3, a prepreg according to the present invention preferably contains the (A) reinforcing fibers existing in the boundary face between and in both of a resin region containing the (B) thermosetting resin and a resin region containing the (C) thermoplastic resin. Here, "the (A) reinforcing fibers existing in the boundary face between and in both of a resin region containing the (B) thermosetting resin and a resin region containing the (C) thermoplastic resin" refers to the (A) reinforcing fibers in a state where both the (B) thermosetting resin and the (C) thermoplastic resin are in contact with the whole circumference of a fiber in a portion of a cross-section of the fibers, and/or in a state where the whole circumference of a fiber in a portion of a cross-section of the fibers is in contact with the (B) thermosetting resin, and where the whole circumference of a fiber in another portion of the cross-section of the fibers is in contact with the (C) thermoplastic resin.

That is, thanks to making such a prepreg, both the resin region containing the (B) thermosetting resin and the resin region containing the (C) thermoplastic resin are bonded to each other via the (A) reinforcing fibers, thus enhancing the joining strength between the resin region containing the (B) thermosetting resin and the resin region containing the (C) thermoplastic resin, and making it difficult for both resin regions to delaminate from each other. Accordingly, even in a case where the resin region containing the (C) thermoplastic resin is utilized to be integrated with a member made of another thermoplastic resin, and formed into a molding product, delamination is inhibited at the boundary face between the resin region containing the (B) thermosetting resin and the resin region containing the (C) thermoplastic resin in a prepreg according to the present invention, thus making it possible for the molding product to strongly resist breaking due to a shear stress at the boundary face. In this regard, it can be said that, in such an aspect, the (A) reinforcing fibers are impregnated also with the (C) thermoplastic resin.

Examples of methods of forming the state where the (A) reinforcing fibers exist in the boundary face between and in both of the resin region containing the (B) thermosetting resin and the resin region containing the (C) thermoplastic resin include: a method in which one face of the (A) reinforcing fibers is coated with the (C) thermoplastic resin that is melted, and then, the opposite face is impregnated with the (B) thermosetting resin; and a method in which the (A) reinforcing fibers are impregnated with the (B) thermosetting resin, then the (C) thermoplastic resin in the form of a sheet, nonwoven fabric, or particle-shape is adhered to a face of the resulting fibers, and then, the resulting product is molded under heating and pressing, whereby the (B) thermosetting resin and the (C) thermoplastic resin are both allowed to flow at the boundary face between both the resins to form the above-mentioned state. Examples of the heating temperature in this case include: a temperature 30° C. or more higher than the melting point of the (C) thermoplastic resin in cases where the (C) thermoplastic resin is crystalline; and a temperature 30° C. or more higher than the glass transition temperature of the (B) thermosetting resin in cases where the (C) thermoplastic resin is amorphous. In cases where a resin having excellent heat resistance is used as the (C) thermoplastic resin, such one face is preliminarily coated with the (C) thermoplastic resin in a preferable method, since a thermoplastic resin has a higher melting point.

It is preferable for a prepreg according to the present invention that a tensile shear strength at room temperature (23° C.), as determined in a test in accordance with JIS K6850 (1994), is 10 MPa or more at the boundary face between the resin region containing the (B) thermosetting resin heat-cured and the resin region containing the (C) thermoplastic resin. Having such a tensile shear strength makes it possible that, even if a different molding technique such as injection molding or compression molding is used in integral molding with a member made of another thermoplastic resin, breaking is inhibited at a point of origin which is the boundary face between the (B) thermosetting resin and the (C) thermosetting resin in a prepreg according to the present invention. The tensile shear strength at the boundary face between the resin region containing the (B) thermosetting resin and the resin region containing the (C) thermoplastic resin is more preferably 20 MPa or more, still more preferably 30 MPa or more. The upper limit of the tensile shear strength is not particularly limited, and 100 MPa or less as the tensile shear strength is sufficient for practical use.

A prepreg according to the present invention preferably has a drapability of 3° or more, as defined below. This affords formability good for the disposition in a mold having a complicated shape having a curved face or a corner in injection molding and compression molding. The drapability is more preferably 10° or more. The upper limit is not limited to any particular value, and is preferably 90° or less because there are some cases where the handleability is poor even if the degree of curvature is large.

Figure 4:
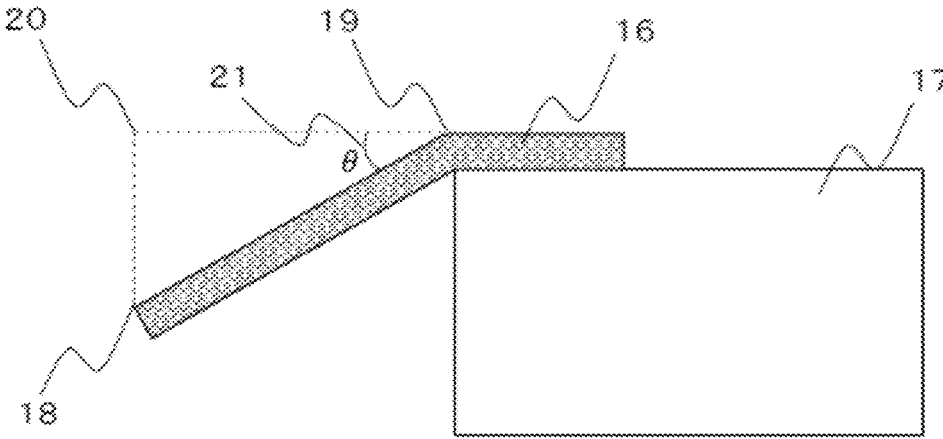
FIG. 4 is a schematic view depicting an evaluation method for drapability.

Drapability is one index that represents the flexibility of a prepreg, that is, how easily a prepreg is formed in a mold. In a measurement method, an evaluation sample is cut out so as to have a width of 25 mm and a length of 300 mm. In a room-temperature environment (23° C.), a portion 100 mm from one end of the sample is fixed on the upper face of a horizontal test bench with an adhesive tape, and further fixed with cellophane tape on the portion, as shown FIG. 4. The remaining 200-mm portion is set so as to protrude from the test bench into the air, the sample is held so as to be horizontal, and then, the hold is released so that the remaining portion can hang down. Five minutes after the sample is released from the hold, an evaluation is made on the basis of a draping angle between the edge of the sample bent by its own weight and the horizontal face of the test bench. Here, assuming that the lowest point at the edge of the sample bent by its own weight is a point a, that the starting point of the protrusion into the air is a point b, and that the intersection between a line drawn from the point a in the vertical direction and a line drawn from the point b in the horizontal direction is a point c, as depicted in FIG. 4, the draping angle (θ, the reference sign 21 in FIG. 4) is represented by the below-mentioned formula. In this manner, five measurements are made, and the arithmetic average is regarded as a value of drapability. Here, in FIG. 4, the sample is bent only at the point b, but in reality, the sample usually makes an arc.

$$\text{Draping angle } \theta(°) = \{\tan^{-1}(lac/lbc)\} \cdot (180/\pi)$$

Here, lac is a distance between the point a and the point c, and lbc is a distance between the point b and the point c.

For a prepreg according to the present invention, it is preferable that the whole prepreg has an average thickness of 50 μm or more and 400 μm or less, and that, assuming that the average thickness is 100%, the resin region containing the (C) thermoplastic resin has an average thickness of 2% or more and 55% or less. Bringing, within the above-mentioned ranges, the ratio of the average thickness of the resin region containing the (C) thermoplastic resin to the average thickness of the whole prepreg affords good drapability and makes it easy to form the prepreg in a mold. This ratio is more preferably 10% or more and 40% or less, still more preferably 10% or more and 25% or less. Bringing the ratio within this range makes it possible to obtain a prepreg further having excellent prepreg windability and unwinding ability in addition to formability. In this regard, the average thickness of the whole prepreg and the average thickness of the resin region containing the (C) thermoplastic resin can be measured as below-mentioned by observing a cross-section of a prepreg under an optical microscope.

That is, a sample having a length of 20 mm and a width of 25 mm is taken from a prepreg, and the thickness of each portion is measured as below-mentioned. A cross-section of the above-mentioned sample is magnified 200 times under a laser microscope (VK-9510, manufactured by Keyence Corporation). Ten portions, excluding the portions at which the thermoplastic resin has a thickness of 0 mm, are randomly selected in such a manner that the fields of view thereof do not overlap one another, and the portions are photographed (for example, observed as depicted in FIG. 3). In each of the images photographed, ten measurement points are selected at regular intervals, and the thickness of the whole prepreg and the thickness of the thermoplastic resin are measured. On the basis of the average value of the measurement data of the total of 100 points, the average thickness of the whole of a typical prepreg is determined as T, and the average thickness of the resin region containing the thermoplastic resin is determined as Tp. Here, the difference is the average thickness Ts of the thermosetting resin.

For a prepreg according to the present invention, it is preferable that the (A) reinforcing fibers are arranged unidirectionally. Arranging the (A) reinforcing fibers unidirectionally makes it possible to efficiently reinforce and stiffen the portions containing the thermoplastic resins. In this case, the prepreg preferably has a tensile strength of 0.3 MPa or more in the direction that is perpendicular to the direction in which the (A) reinforcing fibers are arranged, and is parallel to a face of the sheet (tensile strength in the direction perpendicular to a fiber). Bringing the tensile strength within this range makes it possible to inhibit fiber misalignment from being caused by injection pressure or compression pressure in cases where injection molding or compression molding is adopted as a method of laminating or joining thermoplastic resin members in a subsequent step. The tensile strength is more preferably 1.2 MPa or more. Bringing the tensile strength with this range makes it possible to withstand injection pressure during injection molding that involves particularly causing the resins to have flowability and generating high pressure. In this regard, the upper limit is subject to no particular limitation, preferably higher, and preferably approximately 1.5 MPa.

Here, the tensile strength in the direction perpendicular to a fiber is measured by the below-mentioned method.

(A) A prepreg in which reinforcing fibers are arranged unidirectionally is cut to a width of 50 mm and a length of 150 mm so that the direction perpendicular to the fibers can be the longitudinal direction. The cut piece is used as an evaluation sample. The evaluation sample is set in a table model universal testing system (AUTOGRAPH AGS, manufactured by Shimadzu Corporation) in such a manner that the distance between the clip grips is 100 mm, and a tensile test is performed at a speed of 100 mm/minute in a room-temperature environment (23° C.). Assuming that the maximum load at which the sample is not broken is Pmax, and that the horizontal cross-sectional area perpendicular to the longitudinal direction of the sample is A, the tensile strength (MPa) in the direction perpendicular to a fiber can be determined by calculation in accordance with the below-mentioned formula. Here, the number of evaluation samples is 5 or more, and the arithmetic average of the values calculated is adopted. In this regard, the tensile strength is a value determined as a yield stress when a tensile test is performed.

$$\text{Tensile strength (MPa) in the direction perpendicular to a fiber} = P\text{max}/A$$

A molding product according to the present invention is a molding product obtained by heat-curing the above-mentioned prepreg in a mold. A molding product that is heat-cured in a mold so as to have a shape equal to the shape of a portion desired to be reinforced and stiffened on an existing part achieves an excellent reinforcing and stiffening effect without delaminating from a face of the existing part. In particular, the molding product can be reinforced and stiffened efficiently on a large part that is difficult to reinsert into a mold. In this regard, the peak temperature of the resulting molding product on a tan δ curve is 195° C. or more.

An integrally molded article according to the present invention is a molding product formed by injection-molding or compression-molding a thermoplastic resin integrally with the above-mentioned prepreg. Using the prepreg makes it possible to efficiently reinforce and stiffen an intended portion of a thermoplastic resin member.

Next, each of the (A) reinforcing fibers, the (B) thermosetting resin, and the (C) thermoplastic resin that can be used suitably in the present invention will be described.

<(A) Reinforcing Fibers>

Examples of the kinds of the (A) reinforcing fibers include carbon fibers, glass fibers, metal fibers, aromatic polyamide fibers, polyaramide fibers, alumina fibers, silicon carbide fibers, boron fibers, basalt fibers, and the like. These may be used singly or in combination of two or more kinds thereof. These reinforcing fibers may be surface-treated. Examples of surface treatments include metallic cladding treatment, coupling agent treatment, sizing agent treatment, additive agent adhesion treatment, and the like. Some of these reinforcing fibers are reinforcing fibers having electrical conductivity. Carbon fibers have a small specific gravity, high strength, and high elastic modulus, and thus, are preferably used as reinforcing fibers.

In FIG. 1, the (A) reinforcing fibers are arranged unidirectionally, but the (A) reinforcing fibers are limited to no particular form as long as the form makes it possible to afford a reinforcing effect. The fibers may be continuous fibers such as long fibers (a fiber bundle) in which reinforcing fibers are arranged unidirectionally, woven fabrics, or the like, or may be discontinuous fibers such as mat weaves or nonwoven fabrics. In this regard, the reinforcing fibers, as used herein, mean an aggregate of such reinforcing fibers in some cases.

Furthermore, the (A) reinforcing fibers may be constituted by a plurality of fibers in the same form, or may be constituted by a plurality of fibers in different forms. The number of single reinforcing fibers constituting one reinforcing fiber bundle is usually 300 to 60,000, preferably 300 to 48,000, more preferably 1,000 to 24,000, considering the production of a base material. The above range may be a combination of any one of the upper limits and any one of the lower limits.

Examples of commercially available products of carbon fibers include "TORAYCA®" T800G-24K, "TORAYCA®" T800S-24K, "TORAYCA®" T700G-24K, "TORAYCA®" T700S-24K, "TORAYCA®" T300-3K, and "TORAYCA®" T1100G-24K (which are all manufactured by Toray Industries, Inc.).

<(B) Thermosetting Resin>

Examples of the (B) thermosetting resins include unsaturated polyester resins, vinyl ester resins, epoxy resins, phenol resins, urea resins, melamine resins, polyimide resins, cyanate ester resins, bismaleimide resins, benzoxazine resins, copolymers thereof, modified products thereof, and resins obtained by blending at least two thereof. An elastomer or rubber component may be added to the thermosetting resin in order to enhance the impact resistance. Among these, epoxy resins excel in mechanical properties, heat resistance, and adhesion to reinforcing fibers, and hence, are preferable. Examples of base compounds of epoxy resins include: bisphenol epoxy resins such as bisphenol A epoxy resins, bisphenol F epoxy resins, bisphenol AD epoxy resins, and bisphenol S epoxy resins; brominated epoxy resins such as tetrabromobisphenol A diglycidyl ether; epoxy resins having a biphenyl skeleton; epoxy resins having a naphthalene skeleton; epoxy resins having a dicyclopentadiene skeleton; novolac epoxy resins such as phenol novolac epoxy resins and cresol novolac epoxy resins; glycidyl amine epoxy resins such as N,N,O-triglycidyl-m-aminophenol, N,N,O-triglycidyl-p-aminophenol, N,N,O-triglycidyl-4-amino-3-methylphenol, N,N,N',N'-tetraglycidyl-4,4'-methylene dianiline, N,N,N',N'-tetraglycidyl-2,2'-diethyl-4,4'-methylene dianiline, N,N,N',N'-tetraglycidyl-m-xylylene diamine, N,N-diglycidyl aniline, and N,N-diglycidyl-o-toluidine; resorcin diglycidyl ether; triglycidyl isocyanurate; and the like.

Examples of curing agents for epoxy resins include dicyan diamide, aromatic urea compounds, aromatic amine compounds, phenol novolac resins, cresol novolac resins, polyphenol compounds, imidazole derivatives, tetramethyl guanidine, thiourea-added amine, carboxylic acid hydrazide, carboxylic acid amide, polymercaptan, and the like. Among these, an aromatic amine compound is used as an amine compound to afford an epoxy resin having good heat resistance. Examples of aromatic amine compounds include 3,3'-diisopropyl-4,4'-diaminodiphenyl sulfone, 3,3'-di-t-butyl-4,4'-diaminodiphenyl sulfone, 3,3'-diethyl-5,5'-dimethyl-4,4'-diaminodiphenyl sulfone, 3,3'-diisopropyl-5,5'-dimethyl-4,4'-diaminodiphenyl sulfone, 3,3'-di-t-butyl-5,5'-dimethyl-4,4'-diaminodiphenyl sulfone, 3,3',5,5'-tetraethyl-4,4'-diaminodiphenyl sulfone, 3,3'-diisopropyl-5,5'-diethyl-4,4'-diaminodiphenyl sulfone, 3,3'-di-t-butyl-5,5'-diethyl-4,4'-diaminodiphenyl sulfone, 3,3',5,5'-tetraisopropyl-4,4'-diaminodiphenyl sulfone, 3,3'-di-t-butyl-5,5'-diisopropyl-4,4'-diaminodiphenyl sulfone, 3,3',5,5'-tetra-t-butyl-4,4'-diaminodiphenyl sulfone, 4,4'-diaminodiphenyl sulfone, 3,3'-diaminodiphenyl sulfone, and the like.

Furthermore, it is preferable that, in the epoxy resin, a thermoplastic resin component soluble in the epoxy resin is contained as a viscosity control agent and in a dissolved state. Such a thermoplastic resin component is dissolved in the epoxy resin, presents a thermosetting property overall, and thus, is regarded as one component of the (B) thermosetting resin. Here, the phrase "soluble in the epoxy resin" refers to having a temperature range in which heating, or heating and stirring, an epoxy resin mixed with a thermoplastic resin component forms a homogeneous phase. Here, the phrase "forms a homogeneous phase" refers to bringing about a state in which no separation is observed visually. Here, the phrase "a dissolved state" refers to a state in which an epoxy resin containing a thermoplastic resin component is brought within a temperature range, and has formed a homogeneous phase. Once a homogeneous phase is formed in a temperature range, separation may occur at a temperature out of the temperature range, for example, at room temperature.

In general, the thermoplastic resin component soluble in an epoxy resin is preferably a thermoplastic resin the main chain of which contains a bond selected from a carbon-carbon bond, an amide bond, an imide bond, an ester bond, an ether bond, a carbonate bond, a urethane bond, a thioether bond, a sulfone bond, and a carbonyl bond. In addition, this thermoplastic resin component may partially have a cross-linked structure, and may be crystalline or amorphous. In particular, the thermoplastic resin component is suitably at least one resin selected from the group consisting of polyamides, polycarbonates, polyacetals, polyphenylene oxides, polyphenylene sulfides, polyalylates, polyesters, polyamideimides, polyimides, polyetherimides, polyimides having a phenyltrimethylindan structure, polysulfones, polyether sulfones, polyether ketones, polyether ether ketones, polyaramides, polyvinyl formal, polyvinyl butyral, phenoxy resins, polyether nitriles, and polybenzimidazoles. To obtain good heat resistance, the component preferably has a glass transition temperature of more than 180° C. from the viewpoint of being less prone to cause heat deformation when used in a molding product. Suitable examples include polyetherimides and polyether sulfones.

<(C) Thermoplastic Resin>

The (C) thermoplastic resin is subject to no particular limitation as long as the resin can be melted by heating. Examples thereof include: polyester-based resins such as polyethylene terephthalate, polybutylene terephthalate, polytrimethylene terephthalate, polyethylene naphthalate, and liquid crystal polyesters; polyolefins such as polyethylene, polypropylene, and polybutylene; styrene resins; urethane resins; polyoxymethylene; polyamides such as polyamide 6 and polyamide 66; polycarbonate; polymethyl methacrylate; polyvinyl chloride; polyphenylene sulfide; polyphenylene ether; modified polyphenylene ether; polyimide; polyamideimide; polyetherimide; polysulfone; modified polysulfone; polyether sulfone; polyarylene ether ketones such as polyketone, polyether ketone, polyether ether ketone, and polyether ketone ketone; polyalylate; polyether nitrile; phenol resins; phenoxy resins; and the like. In addition, these thermoplastic resins may be copolymers or modified products of the above-mentioned resins, and, in addition, may each be a blend of two or more selected from the above-mentioned resins and copolymers or modified products thereof. Among others, one or more selected from polyarylene ether ketone, polyphenylene sulfide, and polyetherimide are preferably a resin(s) or a resin composition(s) contained in an amount of 60 weight % or more in the (C) thermoplastic resin from the viewpoint of heat resistance. An elastomer or rubber component may be added in order to enhance the impact resistance. Furthermore, another filler or additive agent may be suitably added depending on the application or the like to the extent that such addition does not impair an object of the present invention. Examples include inorganic fillers, flame retardants, conducting agents, crystal nucleating agents, ultraviolet absorbing agents, antioxidants, vibration damping agents, antibacterial agents, insect repellents, deodorants, anti-coloring agents, heat stabilizers, release agents, antistatic agents, plasticizers, lubricants, coloring agents, pigments, dyes, blowing agents, foam control agents, coupling agents, and the like.

In addition, various application forms can be adopted to apply the (C) thermoplastic resin to a sheet-like material in which the (A) reinforcing fibers are preliminarily impregnated with the (B) thermosetting resin. Examples of such methods include: a method in which the (C) thermoplastic resins formed in sheet form or nonwoven fabric form are laminated; a method in which the (C) thermoplastic resin in particle-shape is sprayed onto a sheet-like material, and the resulting product is heated to become integrated; and the like.

<Applications>

An integrally molded article according to the present invention can be obtained by disposing the prepreg in a mold for injection molding or compression molding, and performing insert molding to integrate the prepreg with a member containing a thermoplastic resin. An integrally molded article according to the present invention is favorably used for the following: structure members for aircrafts; windmill vanes; outer panels and seats for automobiles; computer applications such as IC trays and housings for notebook personal computers; sports applications such as golf club shafts and tennis rackets; and the like.

EXAMPLES

Below, the present invention will be described in further detail with reference to Examples. However, the scope of the present invention is not construed to be limited to these Examples.

(1) Materials Used (A) Reinforcing Fibers

A-1: carbon fibers ("TORAYCA®" T700S-24K, manufactured by Toray Industries, Inc.; the strand tensile strength, 4.9 GPa) arranged at regular intervals in parallel A-2: woven fabric made of plain-woven carbon fibers (the areal weight, 193 g/m$^2$)

(B) Thermosetting Resin

The thermosetting resin was prepared using the following materials.

Base Compounds of Epoxy Resin:

a) tetraglycidyl diamino diphenyl methane ("Araldite®" MY721, manufactured by Huntsman Advanced Materials; the epoxy equivalent, 113 (g/eq.), a tetrafunctional glycidyl amine epoxy resin).

b) bisphenol A epoxy resin ("jER®" 825, manufactured by Mitsubishi Chemical Corporation; the epoxy equivalent, 175 (g/eq.))

c) bisphenol fF epoxy resin ("Epc®" 830, manufactured by DIC Corporation; the epoxy equivalent, 170 (g/eq.))

Curing Agent for Epoxy Resin:

d) 4,4'-diaminodiphenyl sulfone (SEIKACURE-S, manufactured by Wakayama Seika Kogyo Co., Ltd.; the active hydrogen equivalent, 62 (g/eq.))

Viscosity Control Agent:

e) polyether sulfone ("SUMIKAEXCEL®" PES5003P, manufactured by Sumitomo Chemical Co., Ltd.)

The above-mentioned materials were used to produce the thermosetting resins B-1 and B-2 according to the following method.

B-1: the a) tetraglycidyl diamino diphenyl methane (60 parts by mass), the b) bisphenol A epoxy resin (40 parts by mass), and the e) polyether sulfone (10 parts by mass) were introduced into a kneader, and underwent heating and mixing so that the viscosity control agent was dissolved. Then, the kneading was continued, during which the temperature was decreased to 100° C. or less. The d) 4,4'-diaminodiphenyl sulfone (45 parts by mass) was added, and the resulting mixture was stirred to obtain a thermosetting resin B-1.

B-2: the a) tetraglycidyl diamino diphenyl methane (60 parts by mass), the c) bisphenol F epoxy resin (40 parts by mass), and the e) polyether sulfone (10 parts by mass) were introduced into a kneader, and underwent heating and mixing so that the viscosity control agent was dissolved. Then, the kneading was continued, during which the temperature was decreased to 100° C. or less. The d) 4,4'-diaminodiphenyl sulfone (45 parts by mass) was added, and the resulting mixture was stirred to obtain a thermosetting resin B-2.

(C) Thermoplastic Resin

C-1: a film composed of polyamide 6 ("AMILAN®" CM1007 (manufactured by Toray Industries, Inc.; the melting point, 225° C.)) and having an areal weight of 10 g/m$^2$ was used.

C-2: a film composed of polyamide 6 ("AMILAN®" CM1007 (manufactured by Toray Industries, Inc.; the melting point, 225° C.)) and having an areal weight of 30 g/m$^2$ was used.

C-3: a film composed of polyamide 6 ("AMILAN®" CM1007 (manufactured by Toray Industries, Inc.; the melting point, 225° C.)) and having an areal weight of 85 g/m$^2$ was used.

C-4: a film composed of acid-modified polypropylene ("ADMER®" QB510 (manufactured by Mitsui Chemicals, Inc.; the melting point, 165° C.)) and having an areal weight of 30 g/m$^2$ was used.

C-5: a film composed of polyether ketone ketone ("KEP-STAN®" 7002 (manufactured by Arkema S.A.; the melting point, 331° C.)) having an areal weight of 30 g/m$^2$ was used.

(D) Materials for Injection Molding

D-1: into a twin-screw extruder, 80 parts of polyamide 6 and 20 parts of the above-mentioned T700S were introduced, and the resulting mixture was kneaded under heating at 250° C. to obtain pellets for injection molding. The average fiber length of T700S in the pellets was 0.1 mm.

D-2: into a twin-screw extruder, 80 parts of acid-modified polypropylene and 20 parts of the above-mentioned T700S were introduced, and the resulting mixture was kneaded under heating at 250° C. to obtain pellets for injection molding. The average fiber length of T700S in the pellets was 0.1 mm.

D-3: into a twin-screw extruder, 80 parts of polyether ketone ketone and 20 parts of the above-mentioned T700S were introduced, and the resulting mixture was kneaded under heating at 360° C. to obtain pellets for injection molding. The average fiber length of T700S in the pellets was 0.1 mm.

(E) Thermoplastic Plate Material

E-1: a randomly-oriented fiber reinforcing thermoplastic resin composed of 80 parts of polyamide 6 and 20 parts of the above-mentioned T700S was used. The plate thickness was 5 mm.

E-2: a randomly-oriented fiber reinforcing thermoplastic resin composed of 80 parts of acid-modified polypropylene and 20 parts of the above-mentioned T700S was used. The plate thickness was 5 mm.

E-3: a randomly-oriented fiber reinforcing thermoplastic resin composed of 80 parts of polyether ketone ketone and 20 parts of the above-mentioned T700S was used. The plate thickness was 5 mm.

(2) Method of Producing Prepreg

Below, the method used for producing a prepreg in the section of Examples will be described.

[Method I]

A reinforcing fiber sheet composed of the (A) reinforcing fibers (described in the section of Examples and Comparative Examples, and the same as in Methods II and III) and having an areal weight of 193 g/m$^2$ was withdrawn, and the reinforcing fiber sheet was run, during which a film of the predetermined (C) thermoplastic resin (described in the section of Examples and Comparative Examples, and the same as in Methods II and III) was disposed on the reinforcing fiber sheet. The (C) thermoplastic resin was melted under heating with an IR heater to be adhered to the whole of one face of the reinforcing fiber sheet, the resulting product was pressed using a nip roll held at a temperature equal to or lower than the melting temperature of the (C) thermoplastic resin, and the reinforcing fiber sheet impregnated with the (C) thermoplastic resin was cooled to obtain a fiber-reinforced plastic intermediate. Then, a release paper is coated with the predetermined (B) thermosetting resin (described in the section of Examples and Comparative Examples, and the same as in Methods II and III) at a resinous areal weight of 100 g/m² using a knife coater to produce a thermosetting resin film. Then, the thermosetting resin film was superposed on the face of the above-mentioned intermediate opposite from the face impregnated with the (C) thermoplastic resin, and the resulting product was pressed under heating using a heat roll to impregnate the fiber-reinforced plastic intermediate with the (B) thermosetting resin to obtain a prepreg. During this, the peak temperature of the prepreg on a tan δ curve was adjusted in accordance with the time of contact between the fiber bundle passing through the heat roll and the roll and in accordance with the roll temperature. Here, the time of contact between the fiber bundle and the roll was adjusted in accordance with the number of rolls and the passage speed of the fiber bundle. In this regard, the running direction of the reinforcing fiber sheet during impregnation was the longitudinal direction with respect to the reinforcing fibers of the prepreg in cases where the reinforcing fibers were arranged unidirectionally, and was the longitudinal direction of the reinforcing fiber woven fabric in cases where the prepreg was made of the woven fabric.

[Method II]

A release paper was coated with the (B) thermosetting resin at a resinous areal weight of 50 g/m² using a knife coater to produce a thermosetting resin film. This resin film was superposed on both sides of a reinforcing fiber sheet composed of the (A) reinforcing fibers having an areal weight of 193 g/m², and the resulting product was pressed under heating using a heat roll, so that the reinforcing fiber sheet was impregnated with the thermosetting resin to obtain a fiber-reinforced plastic intermediate. The (C) thermoplastic resin film was disposed on a face of the fiber-reinforced plastic intermediate, and the resulting product was pressed under heating to be impregnated with the (C) thermoplastic resin, whereby a prepreg was obtained. The peak temperature of the prepreg on a tan δ curve was adjusted in accordance with the time of contact between the fiber bundle passing through the heat roll and the roll and in accordance with the roll temperature in the same manner as described above.

[Method III]

A release paper was coated with the (B) thermosetting resin at a resinous areal weight of 50 g/m² using a knife coater to produce a thermosetting resin film. This resin film was superposed on both sides of a reinforcing fiber sheet composed of the (A) reinforcing fibers having an areal weight of 193 g/m², and the resulting product was pressed under heating using a heat roll, so that the reinforcing fiber sheet was impregnated with the thermosetting resin to obtain a prepreg. The peak temperature of the prepreg on a tan δ curve was adjusted in accordance with the time of contact between the fiber bundle passing through the heat roll and the roll and in accordance with the roll temperature in the same manner as described above.

(3) Measurement of Loss Tangent (Tan δ) Peak Temperature by Dynamic Mechanical Analysis (DMA)

From a prepreg, one piece composed only of a region in which the (A) reinforcing fibers were impregnated with the (B) thermosetting resin was taken as a sample in an amount of approximately 1 g, and the sample was subjected to DMA using a dynamic mechanical analyzer (ARES rheometer, manufactured by TA Instruments, Inc.) in accordance with JIS C6481 to determine the peak temperature on a tan δ curve. The temperature corresponding to the peak on the tan $\delta=G''/G'$ curve obtained from the ratio between the storage modulus G' and loss modulus G'' of each prepreg was evaluated. The isokinetic heating measurement was performed at a heating rate of 5° C./minute and at a frequency f of 1 Hz.

(4) Measurement of Loss Angle δ Curve by Dynamic Mechanical Analysis (DMA)

From the prepreg, only a region containing the (A) reinforcing fibers impregnated with the (B) thermosetting resin was taken, and used for measurement. However, in cases where the sample had a thickness of less than 1 mm, the sample was thickened by lamination so as to have a thickness of approximately 1 mm. In the case of a unidirectional material, a laminate formed as per [0°/90°]s (the sign S represents mirror symmetry) was used as a sample, assuming that the fiber direction of the (A) reinforcing fibers was 0°, and that the direction perpendicular to the fibers was 90°. The sample was used for isothermally measuring a loss angle $\delta$ ($=\tan^{-1}(G''/G')$) by DMA using a dynamic mechanical analyzer (ARES rheometer, manufactured by TA Instruments, Inc.) in accordance with JIS K7244-10. The temperature was raised isokinetically from 30° C. to 140° C. at a heating rate of 5° C./minute, and then, at 140° C., isothermal measurement was started. The measurement was performed at a frequency of 10 Hz. In this connection, 140° C. was adopted as a mold temperature that is commonly used for integrated molding.

(5) Method of Verifying Existence of Fibers in and Around Boundary Face

From the prepreg, a sample having a length of 10 mm and a width of 10 mm was taken, and underwent the below-mentioned procedure to verify the existence of the (A) reinforcing fibers in the boundary face between and in both of the resin region of the (B) thermosetting resin and the resin region of the (C) thermoplastic resin. Such a sample was taken from each of the 10 portions selected randomly, and the sample was subjected to ultrasonic cleaning with methyl alcohol for 30 minutes to remove the (C) thermoplastic resin. The resulting sample was observed under a Scanning Electron Microscope (VK-9510, manufactured by Keyence Corporation). In cases where one or more fibers bared in the whole face of each of the samples taken from the 10 portions were observed, the (A) reinforcing fibers were judged to exist in the boundary face between and in both of the (B) thermosetting resin and the (C) thermoplastic resin.

(6) Drapability

As shown FIG. 4, the prepreg was cut out to a width of 25 mm and a length of 300 mm, and used as an evaluation sample. In this regard, the longitudinal direction of the reinforcing fibers of the prepreg was regarded as the longitudinal direction of the sample in cases where the fibers were arranged unidirectionally, and the longitudinal direction of the reinforcing fiber woven fabric was regarded as the longitudinal direction of the sample in cases where the prepreg was made of the woven fabric. In a room environment (23° C.), a portion 100 mm from one end of the sample was fixed on the upper face of a horizontal test bench with an adhesive tape, and further fixed with cellophane tape on the portion. The remaining 200-mm portion was protruded into the air, and the sample was held so as to be horizontal. Five minutes after the sample was released from the hold and hung down, an angle at which the edge of the sample was pulled down by its own weight was evaluated as drapability. Here, assuming that the lowest point at the edge of the sample bent by its own weight is a point a, that the starting point of the protrusion into the air is a point b, and that the intersection between a line drawn from the point a in the vertical direction and a line drawn from the point b in the horizontal direction is a point c, the draping angle θ is represented by the below-mentioned formula. In this manner, five measurements are made, and the arithmetic average is regarded as a value of drapability.

$$\text{Draping angle } \theta(^\circ)=\{\tan^{-1}(lac/lbc)\}\cdot(180/\pi)$$

Here, lac is a distance between the point a and the point c, and lbc is a distance between the point b and the point c.

(7) Prepreg, Thermoplastic Resin Layer, and Thickness of Thermosetting Resin Layer A sample having a length of 20 mm and a width of 25 mm was taken from a prepreg, and the thickness of each portion was measured as below-mentioned. A cross-section of the above-mentioned sample was magnified 200 times under a laser microscope (VK-9510, manufactured by Keyence Corporation). Ten portions, excluding the portions at which the thermoplastic resin had a thickness of 0 mm, were randomly selected in such a manner that the fields of view thereof did not overlap one another, and the portions were photographed (for example, observed as depicted in FIG. 3). In each of the images photographed, ten measurement points were selected at regular intervals (vertical baselines for thickness measurement, 15), and the thickness of the whole prepreg and the thickness of the thermoplastic resin layer were measured. On the basis of the average value of the measurement data of the total of 100 points, the thickness of a typical prepreg was determined as T, and the thickness of the thermoplastic resin layer was determined as Tp. The difference therebetween was regarded as the thickness Ts of the thermosetting resin layer.

(8) Tensile Strength in the Direction Perpendicular to a Fiber

A prepreg in which reinforcing fibers were arranged unidirectionally was cut to a width of 50 mm and a length of 150 mm so that the direction perpendicular to the direction in which the reinforcing fibers were oriented could be the longitudinal direction. The cut piece was used as an evaluation sample. The evaluation sample was set in a table model universal testing system (AUTOGRAPH AGS, manufactured by Shimadzu Corporation) in such a manner that the distance between the clip grips was 100 mm, and a tensile test was performed at a speed of 100 mm/minute in a room-temperature environment (23° C.). Assuming that the maximum load at which the sample was not broken was Pmax, and that the horizontal cross-sectional area perpendicular to the longitudinal direction of the sample was A, the tensile strength (MPa) in the direction perpendicular to a fiber was calculated in accordance with the below-mentioned formula.

$$\text{Tensile strength (MPa) in the direction perpendicular to a fiber}=Pmax/A$$

(9) Handleability

The handleability was evaluated in a relative manner according to the below-mentioned four ratings from the viewpoint of stickiness to working gloves with which the prepreg according to the present invention was handled in a room-temperature environment (23° C.).

⦾: when the prepreg is taken up with a hand, the prepreg does not stick to the working glove, and the resin does not adhere to the working glove.

○: when the prepreg was taken up with a hand, the prepreg did not stick to the working glove, but a slight amount of the resin adhered to the working glove.

Δ: when the prepreg was taken up with a hand, the prepreg stuck to the working glove, but the orientation of the (A) reinforcing fibers contained in the prepreg was not disordered.

x: when the prepreg was taken up with a hand, the prepreg stuck to the working glove, and the orientation of the (A) reinforcing fibers contained in the prepreg was disordered.

(10) Formation of Molding Product

The prepreg was placed on a mold preheated to 140° C. in such a manner that the face of the prepreg, in which the face contained the (C) thermoplastic resin, was in contact with a face of a mold for injection molding. The prepreg was held until the prepreg was completely cured, to obtain a molding product in conformance with the shape of the mold.

(11) Formation of Integrally Molded Article

Below, a method for each of injection molding and compression molding will be described.

[Integration by Injection Molding]

The prepreg was inserted in a mold preheated to 140° C. in such a manner that the face of the prepreg, in which the face contained the (C) thermoplastic resin, was in contact with a face of a mold for injection molding. The mold was filled with the (D) injection molding material by injection to obtain an integrally molded article reinforced and stiffened with the prepreg. Here, the (D) injection molding material was melted in a heating cylinder by heating to a temperature 30° C. higher than the melting point of the injection molding material, and injection-molded at a screw speed of 60 rpm, at an injection speed of 90 mm/second, at an injection pressure of 200 MPa, and at a back pressure of 0.5 MPa.

An injection molding mold used for integrated molding had a plane having a length of 300 mm and a width of 300 mm and a curved face having an arc length of 302 mm as in a column having a radius of 225 mm and a height of 280 mm.

[Integration by Compression Molding]

The face of the prepreg, in which the face contained the (C) thermoplastic resin, was superposed on the (E) thermoplastic plate material, and then, the resulting product was disposed in such a manner that the face of the prepreg, in which the face did not contain the (C) thermoplastic resin, was in contact with a face of a flat plate mold preheated to 140° C. The resulting product was pressed using a press machine, heated to a temperature 30° C. higher than the melting point of the (E) thermoplastic plate material, then held for 1 minute, and then cooled to obtain an integrally molded article. Here, an evaluation was performed under two conditions of pressure applied by the press machine, as follows: a low pressure (0.5 MPa) and a high pressure (5.0 MPa).

(12) Adhesion to Mold

The adhesion to the injection molding mold in which the prepreg was disposed during the above-mentioned formation of an integrally molded article was evaluated in a relative manner according to the below-mentioned four ratings.

⦾: the prepreg was adhered to a mold in less than 3 seconds after being pressed against the mold, and caused no positional shift on the mold.

○: the prepreg adhered to a mold in 3 seconds or more and less than 10 seconds after being pressed against the mold, and caused no positional shift on the mold in any of 5 cases of molding.

Δ: the prepreg adhered to a mold in 3 seconds or more and less than 10 seconds after being pressed against the mold, but the adhesion was unstable, and caused no positional shift on the mold in the range of from 2 cases to 4 cases out of 5 cases of molding.

x: the prepreg did not become adhesive to a mold within 10 seconds or more after being pressed against the mold, and caused no positional shift on the mold in the range of from 0 case to 1 case out of 5 cases of molding.

(13) Formability on Curved Mold Face

The formability on a curved mold face of an injection molding mold in which the prepreg was disposed during the above-mentioned formation of an integrally molded article was evaluated in a relative manner according to the below-mentioned four ratings.

•: the prepreg exhibited flexibility in less than 3 seconds after being pressed against a mold, and the prepreg was capable of being formed in conformance with the curved mold face.

○: the prepreg exhibited flexibility in 3 seconds or more and less than 10 seconds after being pressed against the mold, and in any of 5 cases of molding, the prepreg was capable of being formed in conformance with the curved mold face.

Δ: the prepreg exhibited flexibility in 3 seconds or more and less than 10 seconds after being pressed against the mold, but the flexibility was unstable, and in the range of from 2 cases to 4 cases out of 5 cases of molding, the prepreg was capable of being formed in conformance with the curved mold face.

x: the prepreg exhibited low flexibility for 10 seconds or more after being pressed against the mold, and in the range of from 0 case to 1 case out of 5 cases of molding, the prepreg was capable of being formed in conformance with the curved mold face.

In this regard, the moldability of a prepreg according to the present invention is expressed by evaluating both the adhesion to a mold and the formability on a curved mold face together in a relative manner.

(14) Appearance Evaluation of Integrally Molded Article

After the above-mentioned formation of an integrally molded article, the appearance was evaluated according to the below-mentioned four ratings on the basis of the following points of view: the shifting of the prepreg into a molding product, the shifting on the side of a molding product, the maintenance of fiber alignment, and the existence of a gap generated inside the prepreg.

•: good from all the viewpoints
○: poor from one of the viewpoints
Δ: poor from two of the viewpoints
x: poor from three or more of the viewpoints.

(15) Tensile Shear Strength Evaluation

Below, the production procedure and evaluation method for a tensile shear evaluation sample will be described.

Using the (B) thermosetting resin used in the corresponding Example or Comparative Example, a release paper was coated at a resinous areal weight of 50 g/m² using a knife coater to produce a thermosetting resin film. This resin film was superposed on both sides of a reinforcing fiber sheet composed of the (A) reinforcing fibers having an areal weight of 193 g/m² and used in the corresponding Example or Comparative Example, and the resulting product was pressed under heating using a heat roll, so that the reinforcing fibers were impregnated with the thermosetting resin. The resulting product was cut to a width of 200 mm and a length of 150 mm to obtain a prepreg (referred to as a lower layer prepreg for convenience). Here, the peak temperature of the lower layer prepreg on a tan δ curve was adjusted to less than 30° C. in accordance with the time of contact between the fiber bundle passing through the heat roll and the roll and in accordance with the roll temperature.

Then, in the case of the prepreg in which the (A) reinforcing fibers were arranged unidirectionally, one of the prepregs produced in Examples or Comparative Examples was cut to a size having a width of 200 mm and a length of 150 mm, and the cut prepregs were laminated on seven of the above-mentioned lower layer prepregs as per [0°/90°]$_{2S}$ (the sign S represents mirror symmetry), assuming that the fiber direction of the (A) reinforcing fibers was 0°, and that the direction perpendicular to the fibers was 90°, in such a manner that the face containing the (C) thermoplastic resin appeared as the external face. A laminate was thus obtained.

In addition, in cases where the (A) reinforcing fibers were composed of plain weave, one of the prepregs produced in Examples or Comparative Examples was cut to a size having a width of 200 mm and a length of 150 mm, and the cut prepregs were laminated on seven of the above-mentioned lower layer prepregs in such a manner that the face containing the (C) thermoplastic resin appeared as the external face. A laminate was thus obtained.

In this regard, in cases where the sample did not contain any face containing the (C) thermoplastic resin, the prepregs were laminated as per [0°/90°]$_{2S}$ (the sign S represents mirror symmetry) without distinguishing the back and front faces, assuming that the direction in which the (A) reinforcing fibers were oriented was 0°, and that the direction perpendicular to the former direction was 90°.

Figure 5:
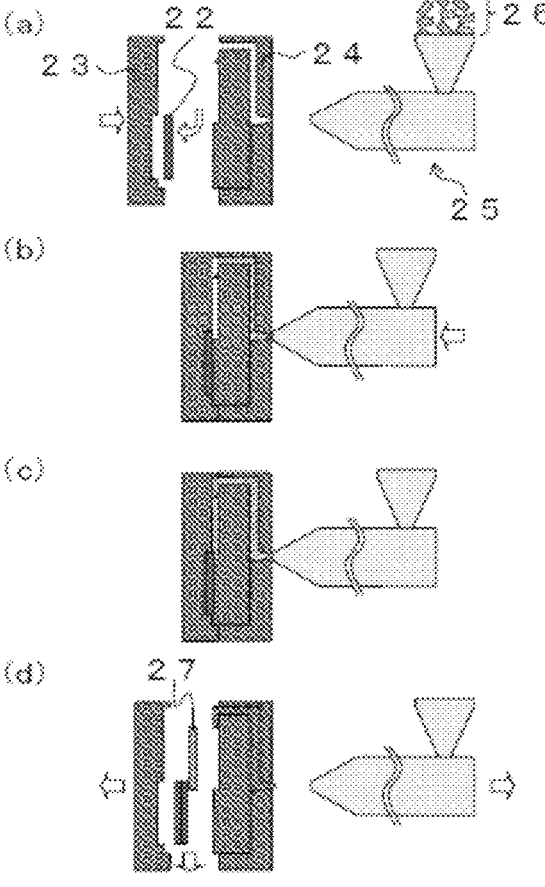
FIG. 5 is a schematic diagram illustrating the procedure for making a sample used in the section of Examples to evaluate the tensile shear strength.

In the evaluation of tensile shear of an integrally molded article obtained by injection molding, the above-mentioned laminate was disposed in an injection molding mold—illustrated in FIG. 5—for production of a tensile shear strength evaluation sample in such a manner that a face of a prepreg produced in Examples or Comparative Examples was the face opposite from the mold side face. Then, an injection molding material (described in the section of Examples and Comparative Examples) was introduced into a mold using an injection molding machine (J150EII-P, manufactured by JSW) to produce an integrally molded article for tensile shear strength evaluation, in which product the injection molding material and the above-mentioned laminate were joined in a region having a width of 200 mm and a length of 12.5 mm. Then, the integrally molded article was placed in an oven, where the (B) thermosetting resin was completely cured by heating treatment. Here, the (D) injection molding material was melted in a heating cylinder by heating to a temperature 30° C. higher than the melting point, and injection-molded at a screw speed of 60 rpm, at an injection speed of 90 mm/second, at an injection pressure of 200 MPa, and at a back pressure of 0.5 MPa. The resulting integrally molded article for tensile shear strength evaluation was cut to a size having a width of 180 mm and a length of 172.5 mm in such a manner that the fiber direction of the face was the longitudinal direction of the sample. Then, the cut product was dried in a vacuum oven for 24 hours, underwent tab adhesion in accordance with ISO4587:1995 (JIS K6850 (1994)), and cut to a width of 25 mm to obtain a tensile shear strength evaluation sample.

In the evaluation of tensile shear of an integrally molded article obtained by compression molding, the above-mentioned laminate was disposed in a compression molding mold for production of a tensile shear strength evaluation sample, in which the mold had the same uneven shape as illustrated in FIG. 5, in such a manner that the face of a prepreg produced in Examples or Comparative Examples was the face opposite from the mold side face. Then, a thermoplastic plate material (described in the section of Examples and Comparative Examples) cut to a width of 200 mm and a length of 150 mm was made ready for use, in which the material had a thickness adjusted through molding under heating and pressing at a temperature 30° C. higher than the melting point so that the resulting material could be disposed in a compression molding mold. The thermoplastic plate material was disposed in a compression molding mold so as to be joined with the above-mentioned laminate in a region having a width of 200 mm and a length of 12.5 mm to produce an integrally molded article for tensile shear strength evaluation. Here, the mold was preliminarily heated to 140° C., and the laminate and thermoplastic plate material were disposed in the mold, and then heated to a temperature 30° C. higher than the melting point of the thermoplastic plate material. The resulting material was molded under heating and pressing under each of the following two conditions: a low pressure (0.5 MPa) and a high pressure (5.0 MPa). The resulting integrally molded article for tensile shear strength evaluation was held under pressure for one minute, cooled, taken out, and cut to a size having a width of 180 mm and a length of 172.5 mm in such a manner that the fiber direction of the face was the longitudinal direction of the sample. Then, the cut product was dried in a vacuum oven for 24 hours, underwent tab adhesion in accordance with ISO4587:1995 (JIS K6850 (1994)), and cut to a width of 25 mm to obtain a tensile shear strength evaluation sample.

The resulting tensile shear strength evaluation sample was used for measurement according to ISO4587:1995 (JIS K6850 (1994)) in a room-temperature environment (23° C.).

Here, in this evaluation, the prepreg in Examples and Comparative Examples was prepared along the longitudinal direction of the (A) reinforcing fibers in cases where the reinforcing fibers in the prepreg were arranged unidirectionally, and the prepreg in Examples and Comparative Examples was prepared along the longitudinal direction of the reinforcing fiber woven fabric in cases where the prepreg contained the woven fabric.

Comparative Example 1

Using A-1 as the (A) reinforcing fibers and B-1 as the (B) thermosetting resin, a prepreg having the peak temperature on a tan δ curve as listed in Table 1 was produced in accordance with Method III for production. Then, the prepreg was inserted in an injection molding mold, and underwent insert injection molding with D-1 used as an injection molding material. In addition, a prepreg separately produced in the above-mentioned Method III for production was inserted in a compression molding mold, and underwent compression molding with E-1 used as a thermoplastic plate material. The characteristics and moldability of the prepreg and the evaluation results of the integrally molded article obtained by injection molding and the integrally molded article obtained by compression molding are tabulated in Table 1.

The moldability was good, but the tensile shear strength of each of the integrally molded articles obtained was extremely low.

Example 1 and Example 2

Using A-1 as the (A) reinforcing fibers, B-1 as the (B) thermosetting resin, and C-4 as the (C) thermoplastic resin, a prepreg having the peak temperature on a tan δ curve as listed in Table 1 was produced in accordance with Method II for production. Then, the prepreg was inserted in an injection molding mold, and underwent insert injection molding with D-2 used as an injection molding material. In addition, a prepreg separately produced in the above-mentioned Method II for production was inserted in a compression molding mold, and underwent compression molding with E-2 used as a thermoplastic plate material. The characteristics and moldability of the prepreg and the evaluation results of the integrally molded article obtained by injection molding and the integrally molded article obtained by compression molding are tabulated in Table 1.

The moldability was good, and the tensile shear strength of each of the integrally molded articles was satisfactory enough for such a product.

Comparative Example 2, Comparative Example 4, and Examples 5 to 8

Using the (A) reinforcing fibers, the (B) thermosetting resin, and the (C) thermoplastic resin that are listed in Table 1, a prepreg having the peak temperature on a tan δ curve as listed in Table 1 was produced in accordance with Method I for production. Then, the prepreg was inserted in an injection molding mold, and underwent insert injection molding with D-1 used as an injection molding material. In addition, a prepreg separately produced in the above-mentioned Method I for production was inserted in a compression molding mold, and underwent compression molding with E-1 used as a thermoplastic plate material. The characteristics and moldability of the prepreg and the evaluation results of the integrally molded article obtained by injection molding and the integrally molded article obtained by compression molding are tabulated in Table 1.

In Comparative Example 2, the fiber alignment of the integrally molded article was significantly disordered, and in Comparative Example 4, the prepreg moved in the mold, failing to be disposed at an intended position. On the other hand, in Examples 5 to 8, the joining strength was high. In Examples 6 and 7 in particular, the adhesion to a mold and the moldability expressed in terms of the formability on a curved mold face, as well as the handleability in a room-temperature environment, were also good, and simultaneously, an extremely high tensile shear strength was exhibited. Additionally, in Example 8, the handleability in a room-temperature environment (23° C.) was further excellent, though the moldability was poorer than in Examples 5 to 7, the fiber alignment of the integrally molded article obtained by high-pressure compression molding was not disordered, and the appearance was better than in Example 6 and Example 7 in which compression molding was performed under the same conditions.

Comparative Example 3

Using A-2 as the (A) reinforcing fibers, B-1 as the (B) thermosetting resin, and C-2 as the (C) thermoplastic resin, a prepreg was produced in accordance with Method I for production. Then, the prepreg was inserted in an injection molding mold, and underwent insert injection molding with D-1 used as an injection molding material. In addition, a prepreg separately produced in the above-mentioned Method I for production was inserted in a compression molding mold, and underwent compression molding with E-1 used as a thermoplastic plate material. The characteristics and moldability of the prepreg and the evaluation results of the integrally molded article obtained by injection molding and the integrally molded article obtained by compression molding are tabulated in Table 1.

In any of the integrally molded articles, the fibers were disordered from the end of the prepreg disposed.

Example 3 and Example 4

Using the (A) reinforcing fibers, the (B) thermosetting resin, and the (C) thermoplastic resin that are listed in Table 1, a prepreg having the peak temperature on a tan δ curve as listed in Table 1 was produced in accordance with Method I for production. Then, the prepreg was inserted in an injection molding mold, and underwent insert injection molding with D-1 used as an injection molding material. In addition, a prepreg separately produced in the above-mentioned Method I for production was inserted in a compression molding mold, and underwent compression molding with E-1 used as a thermoplastic plate material. The characteristics and moldability of the prepreg and the evaluation results of the integrally molded article obtained by injection molding and the integrally molded article obtained by compression molding are tabulated in Table 1.

In Example 4, the prepreg had high stiffness but simultaneously had good adhesion to a mold, and was capable of being integrally molded. The integrally injection-molding products in Examples 3 and 4 each had a portion in which the fiber alignment was slightly impaired, but the products exhibited excellent tensile shear strength. In contrast, the fiber alignment of the integrally molded article obtained by high-pressure compression molding was significantly disordered and spread along with the flow of the resin, and thus, the product failed to retain its shape.

Example 9

Using A-2 as the (A) reinforcing fibers, B-1 as the (B) thermosetting resin, and C-2 as the (C) thermoplastic resin, a prepreg having the peak temperature on a tan δ curve as listed in Table 1 was produced in accordance with Method I for production. Then, the prepreg was inserted in an injection molding mold, and underwent insert injection molding with D-1 used as an injection molding material. In addition, a prepreg separately produced in the above-mentioned Method I for production was inserted in a compression molding mold, and underwent compression molding with E-1 used as a thermoplastic plate material. The characteristics and moldability of the prepreg and the evaluation results of the integrally molded article obtained by injection molding and the integrally molded article obtained by compression molding are tabulated in Table 1.

The integrally injection-molding product, which was capable of holding fiber alignment better than in Comparative Example 3, had excellent appearance, but the appearance of the integrally molded article obtained by high-pressure compression molding had fiber alignment disordered from the end of the prepreg.

Examples 10 to 12

Using A-1 as the (A) reinforcing fibers, B-2 as the (B) thermosetting resin, and C-5 as the (C) thermoplastic resin, a prepreg having the peak temperature adjusted on a tan δ curve as listed in Table 2 was produced in accordance with Method I for production. Then, the prepreg was inserted in an injection molding mold, and underwent insert injection molding with D-3 used as an injection molding material. In addition, a prepreg separately produced in the above-mentioned Method I for production was inserted in a compression molding mold, and underwent compression molding with E-3 used as a thermoplastic plate material. The characteristics and moldability of the prepreg and the evaluation results of the integrally molded article obtained by injection molding and the integrally molded article obtained by compression molding are tabulated in Table 1.

With any of the integrally molded articles, the moldability expressed in terms of the adhesion to a mold and the formability on a curved mold face was good, and the appearance was good. In particular, Example 10 had excellent moldability, and exhibited extremely high tensile shear strength. In the case of high-pressure compression molding, however, the appearance was better in Example 11 and Example 12 than in Example 10.

CONCLUSION

In all Examples, the tensile shear strength measured in the integrally molded article was more than 10 MPa, and thus, the tensile shear strength at the boundary face between the resin region containing the (B) thermosetting resin cured and the resin region containing the (C) thermoplastic resin in the prepreg produced in each of the Examples was estimated to be more than 10 MPa.

The integrally molded article in Example 1 resulted in having excellent tensile shear strength, compared with Comparative Example 1. This is because a face of the prepreg in Example 1 had a coating of the (C) thermoplastic resin having thermal weldability, thus making it possible for the prepreg to be integrated with an injection material. On the other hand, it was seemingly possible that the prepreg in Comparative Example 1, not having a coating of the (C) thermoplastic resin, was integrated with an injection material. However, the prepreg had such extremely low tensile shear strength as to easily delaminate by human power.

Comparison between Comparative Examples 2 and 4 and Examples 5 to 12 verified that having a peak temperature of more than 100° C. and 180° C. or less on a tan δ curve contributed to good adhesion and formability on an injection molding mold and excellent moldability. This is conceivably because the prepreg exhibits suitable adhesiveness and flexibility on a mold, and this effect made it possible to obtain an integrally molded article having excellent appearance and tensile shear strength. In particular, Examples 6, 7, and 10 exhibited an excellent balance between the moldability and the appearance of the integrally molded article. This is conceivably because the peak temperature of approximately 110° C. or more and 140° C. or less on a tan δ curve made it possible to hold the alignment of the (A) reinforcing fibers, and simultaneously to obtain good adhesion and flexibility by virtue of heating from the face of the mold.

In Comparative Example 2 and Comparative Example 3, the results were generally the same. This is conceivably because, even in cases where the (A) reinforcing fibers of the prepreg were woven fabrics, having a peak temperature of 100° C. or less on a tan δ curve caused the fiber alignment at the end of the prepreg to be impaired by injection pressure during insert injection molding in the same manner as with the unidirectionally arranged fibers. In this regard, also comparison between Example 5 and Example 9 verified that the prepreg exhibited the same shape retainability in any of the cases where the (A) reinforcing fibers were arranged unidirectionally with the woven fabric.

In Example 9, the integrally molded article had excellent appearance, compared with Comparative Example 3. This is conceivably because, even in cases where the (A) reinforcing fibers were woven fabrics, allowing the (B) thermosetting resin to have a specific peak temperature on a tan δ curve made it easy to hold the fiber alignment.

Comparison among Examples 3 to 12 verified that different methods of producing a prepreg made it possible to obtain the same degree of moldability and appearance of an integrally molded article by virtue of adjusting the peak temperature on a tan δ curve. In this regard, in comparison among Example 3, Example 4, and Example 5, the prepregs different in the thickness of the layer of the (C) thermoplastic resin were used, and as a result, Example 3 having a smaller thickness had better drapability but a slightly poorer tensile shear strength than Example 4 and Example 5.

Compared with Example 1, Example 6 resulted in exhibiting even higher tensile shear strength after integrated molding, and this is conceivably because allowing the (A) reinforcing fibers to exist in the boundary face between and in both of the (B) thermosetting resin and the (C) thermoplastic resin made it possible to exhibit firm joining strength. In this regard, this tendency was verified by comparison between Example 2 and Example 7.

In Example 8, the moldability was not better than in Example 6, and this is conceivably because the prepreg had low flexibility and was rigid. Furthermore, in Example 4, the formability on a curved mold face was poorer than in Example 6, and this is conceivably because the (C) thermoplastic resin had a large thickness and low flexibility.

In Example 3, the adhesion to a curved mold face and the formability were excellent, but the appearance of the integrally molded article was slightly poorer than in Example 6. This is conceivably because the tensile strength in the direction perpendicular to a fiber of the prepreg was low, thus causing the fiber alignment to be impaired by pressure during molding under heating and pressing and by the flow of the resin. In comparison between Example 11 and Example 12, a difference in flexibility was found, but was in a suitable range under the condition [II], thus making it possible to verify that the prepreg became suitable for use.

Comparison between Example 6 and Example 10 and comparison between Example 8 and Example 11 each verified that all the prepregs produced using different materials made it possible to obtain the same degree of moldability and appearance of an integrated molding by virtue of adjusting the peak temperature on a tan δ curve. In addition, it was also verified that the prepreg having no peak having a height of 5° or more on a loss angle δ curve had even better handleability in a room-temperature environment (23° C.). On the other hand, it was suggested that the moldability expressed in terms of adhesion to a mold and formability on a curved mold face was poor, but the fiber alignment was less disordered even during high-pressure compression molding, and the shape retainability was excellent.

TABLE 1-1

| | | | Example 1 | Example 2 | Example 3 | Example 4 |
|---|---|---|---|---|---|---|
| Constituents of prepreg | (A) Reinforcing fiber | | A-1 | A-1 | A-1 | A-1 |
| | (B) Thermosetting resin | | B-1 | B-1 | B-2 | B-2 |
| | (C) Thermoplastic resin | | C-4 | C-4 | C-1 | C-3 |
| Method of producing prepreg | | | II | II | I | I |
| Characteristics of prepreg | Peak temperature on tan & curve of thermosetting resin | ° C. | 112 | 150 | 102 | 101 |
| | Whether reinforcing fibers exist in boundary face between and in both of thermosetting resin and thermoplastic resin | — | No | No | Yes | Yes |
| | Drapability | ° | 5.5 | 3.4 | 9.9 | 4.2 |
| | Whether loss angle δ curve has maximum value | — | Yes | No | Yes | Yes |
| | Whether loss angle δ curve has a point 5° or more smaller than maximum value on earlier time side of point representing the maximum value | — | Yes | — | Yes | Yes |
| | Whether loss angle δ curve has section in which loss angle δ value becomes 5° or more smaller at slope of −1.4°/minute or more | — | No | Yes | No | No |
| | Thickness T of whole prepreg | μm | 125 | 125 | 125 | 125 |
| | Thickness Ts of thermosetting resin layer | μm | 100 | 100 | 115 | 55 |
| | Thickness Tp of thermoplastic resin layer | μm | 25 | 25 | 10 | 70 |
| | Tp/T | % | 20 | 20 | 8 | 56 |
| | Perpendicular-to-fiber tensile strength | MPa | 2.3 | 3.0 | 1.5 | 1.6 |
| Handleability | | — | ○ | ● | Δ | Δ |
| Moldability | Adhesion to mold | — | ● | Δ | ● | ● |
| | Formability on curved mold face | — | ● | ○ | ● | Δ |
| Integrally molded article | Injection molding | (D) Injection molding material | D-2 | D-2 | D-1 | D-1 |
| | | Appearance | — | ● | ● | Δ | ○ |
| | | Tensile shear strength | MPa | 15.2 | 15.0 | 24.2 | 26.6 |
| | Press molding | (E) Thermoplastic plate material | E-2 | E-2 | E-1 | E-1 |
| | | Molding pressure 0.5 MPa Appearance | — | ● | ● | Δ | ○ |
| | | Tensile shear strength | MPa | 14.9 | 14.9 | 24.1 | 26.5 |
| | | Molding pressure 5.0 MPa Appearance | — | ○ | ● | Δ | Δ |
| | | Tensile shear strength | MPa | 15.0 | 15.0 | 22.3 | 23.5 |

| | | | Example 5 | Example 6 | Example 7 | Example 8 |
|---|---|---|---|---|---|---|
| Constituents of prepreg | (A) Reinforcing fiber | | A-1 | A-1 | A-1 | A-1 |
| | (B) Thermosetting resin | | B-1 | B-1 | B-1 | B-1 |
| | (C) Thermoplastic resin | | C-2 | C-2 | C-2 | C-2 |
| Method of producing prepreg | | | I | I | I | I |
| Characteristics of prepreg | Peak temperature on tan δ curve of thermosetting resin | ° C. | 101 | 112 | 138 | 178 |
| | Whether reinforcing fibers exist in boundary face between and in both of thermosetting resin and thermoplastic resin | — | Yes | Yes | Yes | Yes |

TABLE 1-1-continued

|  |  |  |  |  |  |  |
|---|---|---|---|---|---|---|
|  | Drapability | ° | 8.9 | 5.5 | 3.8 | 2.9 |
|  | Whether loss angle δ curve has maximum value | — | Yes | Yes | No | No |
|  | Whether loss angle δ curve has a point 5° or more smaller than maximum value on earlier time side of point representing the maximum value | — | Yes | Yes | — | — |
|  | Whether loss angle δ curve has section in which loss angle δ value becomes 5° or more smaller at slope of −1.4°/minute or more | — | No | No | Yes | Yes |
|  | Thickness T of whole prepreg | μm | 125 | 125 | 125 | 125 |
|  | Thickness Ts of thermosetting resin layer | μm | 100 | 100 | 100 | 100 |
|  | Thickness Tp of thermoplastic resin layer | μm | 25 | 25 | 25 | 25 |
|  | Tp/T | % | 20 | 20 | 20 | 20 |
|  | Perpendicular-to-fiber tensile strength | MPa | 1.4 | 2.2 | 2.5 | 3.6 |
| Handleability |  | — | Δ | ○ | ● | ● |
| Moldability | Adhesion to mold | — | ● | ● | ○ | Δ |
|  | Formability on curved mold face | — | ● | ● | ○ | Δ |
| Integrally molded article | Injection molding (D) Injection molding material |  | D-1 | D-1 | D-1 | D-1 |
|  | Appearance | — | ○ | ● | ● | ● |
|  | Tensile shear strength | MPa | 26.6 | 27.4 | 30.6 | 29.9 |
|  | Press molding (E) Thermoplastic plate material |  | E-1 | E-1 | E-1 | E-1 |
|  | Molding pressure 0.5 MPa  Appearance | — | ○ | ● | ● | ● |
|  | Tensile shear strength | MPa | 27.0 | 30.2 | 29.7 | 29.1 |
|  | Molding pressure 5.0 MPa  Appearance | — | Δ | ○ | ○ | ● |
|  | Tensile shear strength | MPa | 24.5 | 29.4 | 29.3 | 29.5 |

TABLE 1-2

|  |  |  | Example 9 | Example 10 | Example 11 | Example 12 |
|---|---|---|---|---|---|---|
| Constituents of prepreg | (A) Reinforcing fiber |  | A-2 | A-1 | A-1 | A-1 |
|  | (B) Thermosetting resin |  | B-1 | B-2 | B-2 | B-2 |
|  | (C) Thermoplastic resin |  | C-2 | C-5 | C-5 | C-5 |
| Method of producing prepreg |  |  | I | I | I | I |
| Characteristics of prepreg | Peak temperature on tan δ curve of thermosetting resin | ° C. | 106 | 110 | 151 | 141 |
|  | Whether reinforcing fibers exist in boundary face between and in both of thermosetting resin and thermoplastic resin | — | Yes | Yes | Yes | Yes |
|  | Drapability | ° | 5.7 | 5.4 | 3.3 | 4.0 |
|  | Whether loss angle δ curve has maximum value | — | Yes | Yes | No | Yes |
|  | Whether loss angle δ curve has a point which represents a loss angle δ value 5° or more smaller than maximum value and which is on earlier time side of point representing the maximum value | — | Yes | Yes | — | No |
|  | Whether loss angle δ curve has section in which loss angle δ value becomes 5° or more smaller at slope of −1.4°/minute or more | — | No | No | Yes | No |
|  | Thickness T of whole prepreg | μm | 125 | 125 | 125 | 125 |
|  | Thickness Ts of thermosetting resin layer | μm | 100 | 100 | 100 | 100 |
|  | Thickness Tp of thermoplastic resin layer | μm | 25 | 25 | 25 | 25 |
|  | Tp/T | % | 20 | 20 | 20 | 20 |
|  | Perpendicular-to-fiber tensile strength | MPa | — | 2.1 | 3.1 | 2.8 |
| Handleability |  | — | Δ | ○ | ● | ● |
| Moldability | Adhesion to mold | — | ○ | ● | Δ | Δ |
|  | Formability on curved mold face | — | ● | ● | ○ | ○ |
| Integrally molded article | Injection molding (D) Injection molding material |  | D-1 | D-3 | D-3 | D-3 |
|  | Appearance | — | ○ | ● | ● | ● |
|  | Tensile shear strength | MPa | 27.7 | 32.4 | 32.3 | 32.3 |
|  | Press molding (E) Thermoplastic plate material |  | E-1 | E-3 | E-3 | E-3 |
|  | Molding pressure 0.5 MPa  Appearance | — | ○ | ● | ● | ● |
|  | Tensile shear strength | MPa | 27.6 | 32.9 | 32.9 | 32.9 |
|  | Molding pressure 5.0 MPa  Appearance | — | Δ | ○ | ● | ● |
|  | Tensile shear strength | MPa | 25.1 | 32.2 | 32.1 | 32.1 |

TABLE 1-2-continued

| | | | Comparative Example 1 | Comparative Example 2 | Comparative Example 3 | Comparative Example 4 |
|---|---|---|---|---|---|---|
| Constituents of prepreg | (A) Reinforcing fiber | | A-1 | A-1 | A-2 | A-1 |
| | (B) Thermosetting resin | | B-1 | B-1 | B-1 | B-1 |
| | (C) Thermoplastic resin | | No | C-2 | C-2 | C-2 |
| Method of producing prepreg | | | III | I | I | I |
| Characteristics of prepreg | Peak temperature on tan δ curve of thermosetting resin | ° C. | 110 | 25 | 25 | 205 |
| | Whether reinforcing fibers exist in boundary face between and in both of thermosetting resin and thermoplastic resin | — | No | Yes | Yes | Yes |
| | Drapability | ° | 6.8 | 18.5 | 19.1 | 1.7 |
| | Whether loss angle δ curve has maximum value | — | Yes | Yes | Yes | No |
| | Whether loss angle δ curve has a point which represents a loss angle δ value 5° or more smaller than maximum value and which is on earlier time side of point representing the maximum value | — | Yes | Yes | Yes | — |
| | Whether loss angle δ curve has section in which loss angle δ value becomes 5° or more smaller at slope of −1.4°/minute or more | — | No | No | No | Yes |
| | Thickness T of whole prepreg | μm | 125 | 125 | 125 | 125 |
| | Thickness Ts of thermosetting resin layer | μm | 125 | 100 | 100 | 100 |
| | Thickness Tp of thermoplastic resin layer | μm | 0 | 25 | 25 | 25 |
| | Tp/T | % | 0 | 20 | 20 | 20 |
| | Perpendicular-to-fiber tensile strength | MPa | 2.2 | 0.2 | — | 5.5 |
| Handleability | | — | ○ | x | x | ● |
| Moldability | Adhesion to mold | — | ● | ● | ● | x |
| | Formability on curved mold face | — | ● | ● | ● | x |
| Integrally molded article | Injection molding | (D) Injection molding material | | D-1 | D-1 | D-1 | D-1 |
| | | Appearance | — | ● | x | x | Avaluative |
| | | Tensile shear strength | MPa | 0.9 | Avaluative | Avaluative | Avaluative |
| | Press molding | (E) Thermoplastic plate material | | E-1 | E-1 | E-1 | E-1 |
| | | Molding pressure 0.5 MPa | Appearance | — | ● | x | x | Avaluative |
| | | | Tensile shear strength | MPa | 1.0 | Avaluative | Avaluative | Avaluative |
| | | Molding pressure 5.0 MPa | Appearance | — | ○ | x | x | Avaluative |
| | | | Tensile shear strength | MPa | 1.1 | Avaluative | Avaluative | Avaluative |

INDUSTRIAL APPLICABILITY

An integrally molded article according to the present invention is preferably used for the following: structure members for aircrafts; windmill vanes; outer panels and seats for automobiles; computer applications such as IC trays and housings for notebook personal computers; sports applications such as golf club shafts and tennis rackets; and the like.

REFERENCE SIGNS LIST

1: Prepreg
2: (A) Reinforcing fibers
3: (B) Thermosetting resin
4: (C) Thermoplastic resin
5: Layer in which (A) reinforcing fibers are impregnated with (B) thermosetting resin
6: Region in the form of a gentle slope having no ups or downs
7: Position of peak
8: Loss angle δ curve (with peak, shape 1)
9: Loss angle δ curve (with peak, shape 2)
10: Loss angle δ curve (with no peak)
11: (A) Reinforcing fibers
12: Resin region containing (B) thermosetting resin
13: Resin region containing (C) thermoplastic resin
14: Boundary face
15: Vertical baselines for thickness measurement
16: Prepreg

17: Test bench
18: Point a
19: Point b
20: Point c
21: Draping angle (°)
22: Laminate
23: Mold (movable part)
24: Mold (Fixed part)
25: Injection molding machine
26: Injection molding material
27: Tensile shear strength evaluation sample

The invention claimed is:

1. A prepreg comprising:
(A) reinforcing fibers,
(B) a thermosetting resin, and
(C) a thermoplastic resin,
wherein the (A) reinforcing fibers are impregnated with the (B) thermosetting resin,
wherein the (C) thermoplastic resin exists in at least a part of a face of the prepreg, and
wherein the prepreg satisfies a condition [I], and satisfies a condition [II] or a condition [III]:
[I]: the (B) thermosetting resin has a peak in the temperature range of more than 100° C. and 180° C. or less on a loss tangent (tan δ) curve measured under isokinetic heating by dynamic mechanical analysis (DMA);
[II]: on a loss angle δ curve obtained by measuring the prepreg isothermally by dynamic mechanical analysis (DMA) at a measurement temperature of 140° C., the loss angle δ curve has a point representing the local maximum value, and has a point which represents a loss angle θ value 5° or more smaller than the local maximum value, and which is on the earlier time side of the point representing the local maximum value; and

[III]: even if, on the loss angle δ curve obtained by measuring the prepreg isothermally by dynamic mechanical analysis (DMA) at a measurement temperature of 140° C., the loss angle δ curve has a point representing the local maximum value, the loss angle δ curve does not have a point which represents a loss angle δ value 5° or more smaller than the local maximum value, and which is on the earlier time side of the point representing the local maximum value, or the loss angle δ curve does not have a point representing the local maximum value, and has a descendingly behaving section in which the loss angle δ value becomes 5° or more smaller at a slope of −1.4°/minute or more.

2. The prepreg according to claim 1, wherein the (A) reinforcing fibers exist in the boundary face between and in both of a resin region containing the (B) thermosetting resin and a resin region containing the (C) thermoplastic resin.

3. The prepreg according to claim 1, wherein, in the (B) thermosetting resin and the (C) thermoplastic resin that are used, a test piece exhibited a tensile shear strength of 10 MPa or more, as measured under a room-temperature (23° C.) atmosphere in accordance with JIS K6850 (1994), using the test piece in which the (B) thermosetting resin heat-cured and the (C) thermoplastic resin are joined via no adhesive.

4. The prepreg according to claim 1, wherein the drapability of the prepreg is 3° or more.

5. The prepreg according to claim 1, wherein the prepreg has an average thickness of 50 μm or more and 400 μm or less, and wherein, assuming that the average thickness is 100%, the resin region containing the (C) thermoplastic resin has an average thickness of 2% or more and 55% or less.

6. The prepreg according to claim 1, wherein the (A) reinforcing fibers are arranged unidirectionally.

7. The prepreg according to claim 6, having a tensile strength of 0.3 MPa or more in the direction that is perpendicular to the direction in which the (A) reinforcing fibers are arranged, and is parallel to a face of a sheet of the prepreg.

8. A molding product produced from the prepreg according to claim 1, wherein the (B) thermosetting resin is heat-cured.

9. An integrally molded article comprising the prepreg according to claim 1, wherein a molded object of a thermoplastic resin is integrated on a face of the prepreg, the face containing the (C) thermoplastic resin.

* * * * *